United States Patent [19]

Poorman et al.

[11] Patent Number: 4,688,200
[45] Date of Patent: Aug. 18, 1987

[54] OPTICAL SYSTEM FOR DETECTING ACOUSTIC WAVE ENERGY IN A FLUID MEDIUM

[75] Inventors: Thomas J. Poorman; David Grissom, both of Houston, Tex.; Edward F. Carome, Berkley, Calif.

[73] Assignee: Western Geophysical Company of America, Houston, Tex.

[21] Appl. No.: 777,322

[22] Filed: Sep. 18, 1985

[51] Int. Cl.$^4$ .......................... H04R 1/02; G01B 9/02
[52] U.S. Cl. .................................... 367/149; 367/140; 250/231 P; 350/96.3; 356/345
[58] Field of Search ........................... 250/231 P, 227; 350/96.29, 96.30; 356/345, 350; 367/20, 76, 78, 79, 80, 140, 141, 149, 151, 169, 172, 173, 178; 73/655, 657

[56] References Cited

U.S. PATENT DOCUMENTS

| | | | |
|---|---|---|---|
| 4,162,397 | 7/1979 | Bucaro et al. | 367/149 |
| 4,422,167 | 12/1983 | Shajenko | 367/149 |
| 4,556,319 | 12/1985 | Gauert et al. | 356/350 |

OTHER PUBLICATIONS

Moore et al., Fiber Optic and Laser Sensors II, SPIE, 5/84, pp. 12-14 and 17.

Primary Examiner—Deborah L. Kyle
Assistant Examiner—Brian S. Steinberger
Attorney, Agent, or Firm—Robert E. Lowe; E. Eugene Thigpen

[57] ABSTRACT

An optical sound source signature transducer system for use in marine seismic exploration in which coherent radiation from a laser is coupled to unequal length optical paths exposed to modulation by the acoustic energy wave generated by the sound source. The reflected beams from the paths are crosscoupled to generate interference fringes in two output beams out of phase with each other. The fringes in one output beam are counted in an up/down counter to determine the magnitude of the pressure as a function of time. The direction of the pressure change is determined by examination of the phase relationship between the fringes in the output beams. Peaks and valleys in the pressure are detected as phase reversals between the fringes in the output beams by detecting the beginning and end of a fringe in one beam without detecting the beginning or end of a fringe in the other beam therebetween. The direction of counting of the counter is reversed upon detection of a peak or valley in the modulating pressure to maintain the count as an accurate representation of the magnitude of the pressure.

20 Claims, 5 Drawing Figures

OPTICAL SYSTEM FOR DETECTING ACOUSTIC WAVE ENERGY IN A FLUID MEDIUM

This invention relates to systems for sensing the pressure envelope, or signature, of sound sources in a fluid medium. One application for such systems is found in the field of marine seismic exploration, wherein a sound source, such as an airgun, is activated in the water so that reflections from subsurface layers can be detected and processed to determine characteristics of the layers. For clarity, the system will be discussed in terms of marine seismic exploration, although those skilled in the art will recognize that this invention is useful in other fields.

In conventional marine seismic exploration for oil and gas, a seismic vessel drags a streamer cable containing pressure-sensitive hydrophones through the water. The vessel is equipped with a source of high intensity sound such as airguns, or explosive charges, which are repetitively activated in the water approximately 35-40 meters from the vessel to direct acoustic energy into the ocean floor. Reflections of this energy from sub-surface geological layers are then detected by the hydrophones.

The reflections are processed by a computer which analyzes the data gathered from the hydrophones. The computer analysis requires signature information from the sounds source concerning the exact instant in time when the impulse of energy was transmitted into the water, as well as information concerning the shape of the acoustic energy wave at various distances from the sound source. Typically 24 airguns, or other sound sources, are used each having an associated transducer for providing such signature information for all the sound sources. The signals received by these transducers are considered "near field" signals in that they were received in the near field of the sound source while the signals reflected from the subterranean layers and received by the hydrophones are considered "far field" signals. It is well known in the art that an analysis of the near field signals is helpful in determining the shape of the far field signals so that the reflections can be precisely analyzed.

The acoustic wave detecting systems used in the past to measure pressure changes as a function of time in the near field of sound sources have not typically been rugged enough to withstand the difficult environment. Seismic sound source signature transducers which must be able to operate in pressures which can reach as high as 20 bars. Conventional signature transducers typically include moving mechanical parts which are highly susceptible to damage from the sudden imposition of such pressures.

SUMMARY OF THE INVENTION

The present invention is directed to a system for detecting acoustic wave energy in a fluid medium by utilizing optical waveguides. In a first embodiment of the invention, the system includes a source of coherent optical radiation, optical fiber waveguides for defining a pair of reflectively terminated optical paths having different path lengths, and a coupler for coupling the coherent optical radiation from the source into the pair of optical paths so that radiation in each path within the fluid medium is modulated by acoustic wave energy, or acoustic field, therein. The coupler also serves to cross couple the modulated optical radiation in each path to produce a pair of output beams each having interference fringes.

In another embodiment of the invention, the optical paths have the same, or matched, path lengths, but one path is isolated from the fluid pressure changes.

In still another embodiment, which may utilize matched or mismatched optical path lengths, the optical fiber waveguides which define the pair of optical paths are not reflectively terminated, a first coupler near one end of the optical paths couples the source of coherent optical radiation thereto and a second coupler near the other end of the optical paths cross couples the modulated radiation from each path to produce the pair of output beams each having interference fringes.

The fringe patterns arise from the mismatch of the path lengths exposed to the acoustic field within the fluid medium which results in phase differences between the modulated beams. A change in fluid pressure causes a change in the length of the fiber waveguides within the fluid medium, and therefore in the effective path length of the optical path, in proportion to the change in pressure within the fluid medium. Fluid pressure changes therefore cause phase differences between the radiation beams in each path, thereby changing the amplitudes of the interference fringes in each output optical beam.

The system also includes an up/down counter responsive to the changing amplitudes of the interference fringes in one of the optical paths. The second output beam is generally similar to, but out of phase with, the first output beam. A decoder is provided to detect changes in the direction of the near field pressure and therefore identify peaks and valleys in the pressure field for the counter. The number accumulated in the counter is increased in response to the occurrence of fringes as long as the pressure is increasing and is decreased in response thereto when the pressure is decreasing.

Additional advantages and features of the invention will be apparent in the Description of the Preferred Embodiment and the accompanying drawings.

DETAILED DESCRIPTION OF A PREFERRED EMBODIMENT

Figure 1:
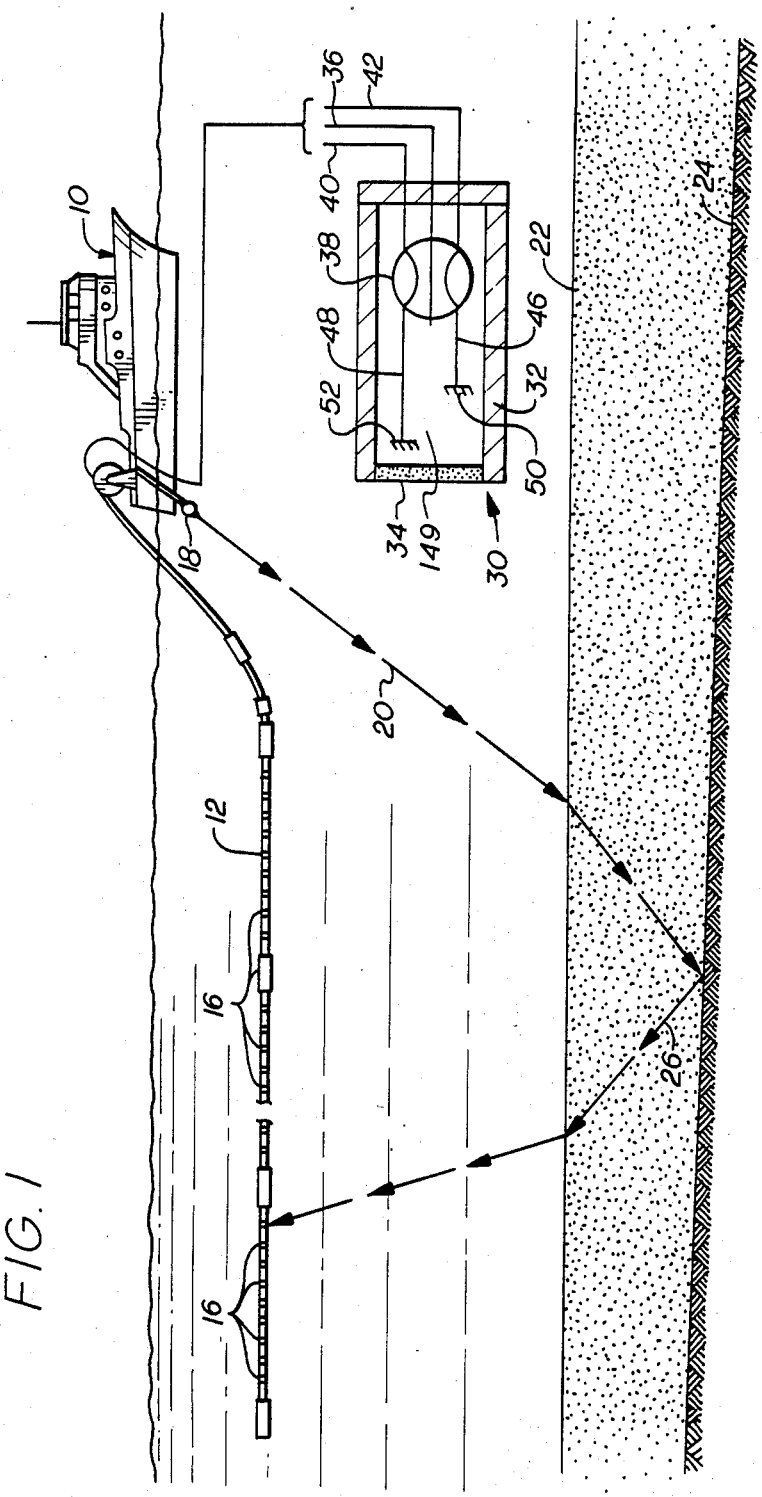
FIG. 1 is an illustration, in schematic form, of a marine seismic exploration system including a vessel, a streamer cable and a sound source together with an optical sound source signature transducer, for detecting acoustic wave energy in the water, constructed in accordance with the invention.
Figures 2, 3:
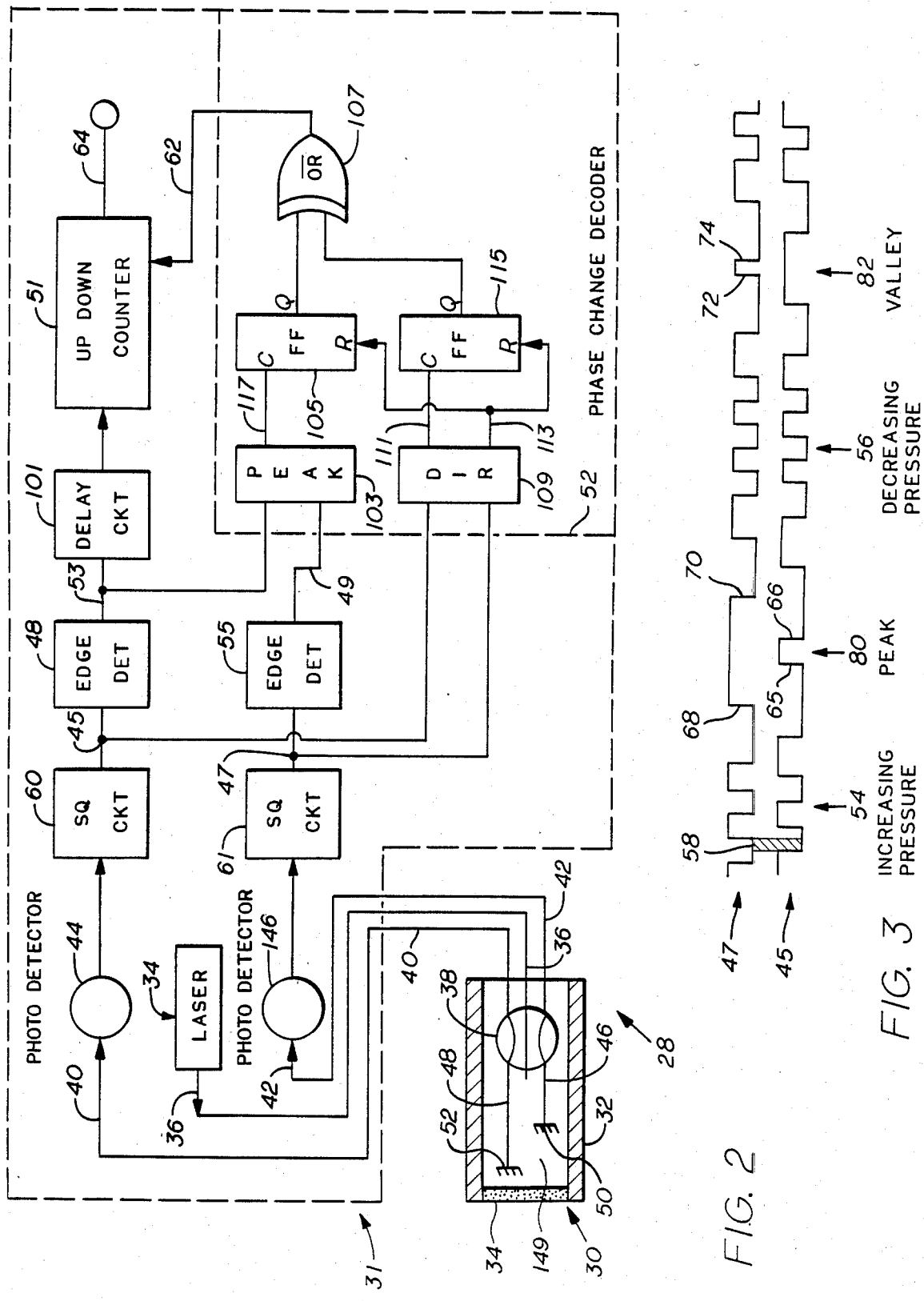
FIG. 2 is a schematic illustration of a preferred embodiment of an optical system including a transducer and signal processing circuitry constructed in accordance with the invention.
FIG. 3 is a graphic representation of the signals in an optical system constructed in accordance with the invention.

FIG. 1 is a schematic illustration of an optical transducer for detecting acoustic waves in a fluid medium constructed in accordance with the invention and forming part of an optical system used for marine seismic exploration. Vessel 10 is depicted towing seismic cable 12 which contains a plurality of pressure sensitive hydrophones 16. Vessel 10 also tows one or more sound sources 18, which may conveniently be airguns. In operation, acoustic energy from sound source 18 travels along path 20 through the water and penetrates ocean floor 22 where it is reflected from one or more subsurface reflecting layers 24. The reflected energy travels along reflection path 26 until it is detected by one or more of the hydrophones 16 is seismic cable 12. The amplitude, shape and travel time of the reflections are recorded for subsequent computer analysis to determine the depth and other characteristics of subterranean layers 24 in accordance with techniques well known in the art which do not form any part of this invention. This subsequent analysis of these reflections, however, requires information concerning the timing and shape of the acoustical impulses from sound source 18. Accordingly, optical system 28 as shown in FIG. 2 is also carried by vessel 10 for determining the timing and shape of the acoustic wave from source 18.

Optical system 28 includes transducer section 30 and onboard section 31. As noted above, a typical system may include many such transducer and onboard sections, but only one is shown for clarity. Transducer section 30 includes generally cylindrical steel housing 32 filled with any suitable fluid 149 such as distilled water which will not damage the optical components therein. External presure of the sea water is communicated to fill fluid 149 through an acoustically transparent window 34 formed from a material suitable for use in a marine environment, such as neoprene rubber. Housing 32 is adapted for submersion in the sea water and may include a potting material instead of fill fluid 149 for substantially sealing the interior of the housing and the enclosed components from the surrounding fluid.

Housing 32 encloses fiber optic waveguide coupler 38 which couples three fiber optic paths, such as the commercially available 3×3 Singlemode Fiber Optic Coupler manufactured and sold by the Defense Electronics Division, Gould, Inc. of Glen Burnie, Maryland. Coupler 38 receives three fiber optic waveguides 36, 40, 42 at its input and two such waveguides 46, 48 at its output. The third output is not used in the present invention and may be retained as a spare for repair or calibration purposes.

Waveguides 46 and 48 define a pair of optical paths having different path lengths within the pressure field. In the embodiment illustrated in FIG. 1, the path estabalished by waveguide 48 is longer than that established by waveguide 46. Pressure changes in sea water are communicated to waveguides 46 and 48 within chamber 32 through window 34 and fluid 149. Variations in pressure in the fluid, such as those caused by sound source 18, cause detectable variations in the length of waveguides 46 and 48. An increase in fluid pressure for example, causes an increase in pressure within housing 32 which, in effect, squeezes the periphery of the waveguide inwardly. Since the length of a waveguide is much greater than its diameter, relatively little force is applied to the tips of the waveguides and substantially all of the pressure induced force is therefore applied in an inward radial direction along the waveguide's length. The radial squeezing of the waveguide causes an increase in its length with the amount of increase being proportional to length. Because of its greater length, waveguide 48 will lengthen more than shorter waveguide 46, for the same applied pressure.

Figure 5:
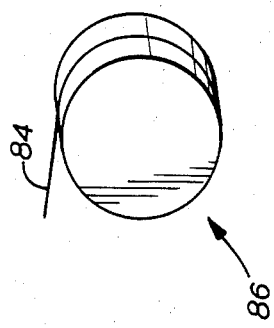
FIG. 5 is an illustration of a mandrel portion of one embodiment of the transducer of this invention upon which the fiber optic waveguide may be wound.

Although neither the shape nor orientation of the optical paths established by waveguides 46 or 48 are critical, these waveguides are conveniently packaged within housing 32 as coils whose axes are generally collinear with the axis of housing 32. The relative path length change resulting from a unit change in fluid pressure may be increased by mounting the optical fiber in tension on a compressible mandrel, constructed from a suitable material such as plastic, as shown in FIG. 5. In that Figure, optical fiber 84 is wound under tension around the periphery of mandrel 86, made of a suitable compressible material. Mandrel 86 is exposed to the changes in pressure in the fluid medium. As the pressure increases madrel 86 is compressed allowing the optical fiber 84 to shorten in length. The relative change in the optical path length in fiber 84 for a given change in pressure can be adjusted within limits by a judicious selection of the tension initially applied to fiber 84 and the compressibility of the material selected for mandrel 86. In this way, the effective path length change per unit pressure change can be amplified.

The optical path established by waveguide 48 may conveniently be approximately 1 or 2 meters in length, while the path established by the shorter waveguide 46 may typically be less than 0.10 meters. The absolute lengths of the optical paths are not critical as long as there is a substantial path length mismatch, preferably on the order of 1 to 2 meters. The fibers forming waveguides 46 and 48 terminate in reflective surfaces 50 and 52. These reflective surfaces may be formed, for example, by sputtering gold onto the ends of the fibers using techniques well known in the art.

At the input side of coupler 38, fiber optic waveguide 36 couples a source of coherent optical radiation such as laser 34 to the input of coupler 38 so that the coherent radiation is split and optically coupled into the paths established by waveguides 46 and 48. The wavelength of radiation is chosen so that its length of coherence is greater than the difference in optical path's lengths. In practice, it has been found that a helium neon laser having a wavelength of 0.63 microns is suitable for use as laser 34.

Radiation from laser 34 split between waveguides 46 and 48 and propagates along the waveguides until it is reflected back to the coupler by reflective surfaces 50 and 52. Coupler 38 serves to crosscouple the reflected beams which then travel to onboard processing circuitry 31 via fiberoptic waveguides 40 and 42 which are connected to the remaining two input channels of coupler 38 as shown. The path length mismatch along waveguides 46 and 48 causes the reflected beams to be out of phase and produce interference fringes when crosscoupled at coupler 38. The optical beams in waveguides 40 and 42 therefore each contain interference fringes related to the phase difference between the two reflected beams. The output beams in waveguides 40 and 42 are preferably 90° out of phase as a result of coupler 38, although in practice, different couplers may vary the phase relationship by as much as 160°.

As previously indicated, a pressure change within housing 32 causes different path length changes in waveguides 46 and 48. The resultant phase change between the reflected beams in waveguides 46 and 48 changes the amplitude of the fringe patterns appearing in the crosscoupled output beams in waveguides 40 and 42. As the pressure in housing 32 changes, the amplitude of the fringes in each beam changes while maintaining the approximate 90° phase relationship with the fringes in the other beam. The number of fringe maxima or minima is proportional to the pressure change which has occurred, and the fringe frequency is a measurement of the slew rate, or rate of change, of the pressure. The number of fringes is counted by up/down counter 51 as explained below.

Figure 4:
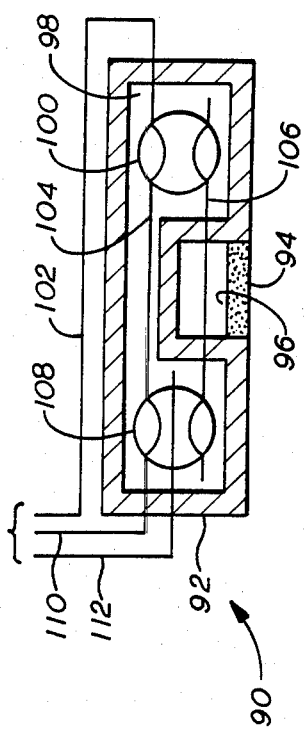
FIG. 4 is an illustration of a transducer in accordance with an alternate embodiment of the invention including a pair of equal length optical paths, only one of which is exposed to pressure changes in the fluid medium, a 2×2 fiber optic coupler for coupling the laser radiation to one end of the optical paths, and a 3×3 optical coupler near the other end of the optical paths for a cross coupling the radiation in the paths to form the interference fringes.

An alternate embodiment of a transducer according to the present invention is shown in FIG. 4. Transducer 90 includes generally cylindrical steel housing 92 having an acoustically transparent window 94 formed from a suitable material, such as neoprene rubber. Transducer 90 differs from transducer 30 shown in FIG. 1 in that it is divided into two chambers, indicated as sensing chamber 96 and isolation or reference chamber 98. Steel housing 92 completely surrounds chamber 98 and effectively prevents pressure changes in the fluid medium in which transducer 90 is immersed from affecting components within chamber 98. Sensing chamber 96 is formed by the combination of a portion of housing 92 and window 94 which transmits pressure changes in the fluid medium into chamber 96. Either or both chambers may be substantially sealed with a suitable potting material, not shown. Only sensing chamber 96 need be filled with fill fluid 149.

Transducer 90 encloses fiber optic waveguide coupler 100 in chamber 98 which splits optical radiation from laser 34 into two paths, typically with a loss on the order of 3 db. Coupler 100 may conveniently be a 2×2 Singlemode Fiber Optic Coupler manufactured and sold by the Defense Electronics Division, Gould, Inc. Coupler 100 is connected to fiber optic waveguide 102 at one of its inputs and to waveguides 104 and 106 at its outputs. The second input is not used in the embodiment shown in this Figure and may be retained as a spare for repair or calibration purposes. The other ends of fiber optic waveguides 104 and 106 are connected to coupler 108 which is also in chamber 98 and will be discussed further below.

Waveguides 104 and 106 define a pair of optical paths having different path lengths affected by pressure changes in the fluid medium in which transducer 90 is immersed. The paths may conveniently have the same nominal path lengths only one of which is affected by such pressure changes. As shown in FIG. 4, waveguide 104 is totally contained within chamber 98 and is therefore effectively isolated from such pressure changes. A portion of waveguide 106 extends through sensing chamber 96 and is therefore subject to such pressure changes along at least a portion of its length. In the same manner as noted with respect to the embodiment described with reference to FIG. 1, such pressure variations cause a change in the optical path length of waveguide 106.

Optical coupler 108 is a 3×3 coupler similar to coupler 38 of FIG. 1. Coupler 108 is mounted in isolation chamber 98 and receives waveguides 104 and 106 at two of its imputs. Waveguides 110 and 112 are connected to two of the outputs of coupler 108. The third input and the third output of coupler 108 are not used in this embodiment and may be retained as spares for repair or calibration purposes.

Operation of transducer 90 is similar to operation of transducer 30 and the signals on waveguides 102, 110 and 112 may be handled in the same manner as the optical signals on waveguides 36, 40 and 42. In general, pressure changes in the fluid medium serve to change the path length of waveguide 106, producing interference fringes in coupler 108. Any two of the three outputs of coupler 108 are out of phase with each other so that onboard signal processing circuitry 31 can count fringes representing pressure change, detect maxima and minima in such pressure change to identify changes in pressure slew direction and determine the absolute direction of such pressure changes as noted below.

Onboard optical signal processing circuitry 31, as shown in FIG. 2, produces a signal indicative of the pressure changes within the fluid by counting the number of fringe maxima or minima in one of the output waveguides. Optical output beams from waveguides 40 and 42 are coupled, respectively, to photodetector circuits 44 and 146 which produce signals indicative of fringe maxima and minima at the photodetector inputs. The output signals from photodetector circuits 44 and 146 are coupled to edge detector circuits 48 and 55 by squaring circuits 60 and 61, respectively, which serve to form the photodetector outputs into easily processed logic level pulses in output signals 45 and 47, each representing the passage of a fringe along one of the output beams. Edge detectors 48 and 55 generate an output pulse on each positive-going and each negative going transition, or edge, of its input signal in order to count the moving fringes. The number of pulses thus generated is twice the number of fringes which have moved past the detector. It would be possible to count the fringes by detecting only the positive going or negative going transitions, or even the high or low signal level states. However, in this preferred embodiment, both edges are detected in order to double the fringe frequency count so that a peak and valley detecting feature, described below, may advantageously be incorporated in order to control the counting direction of counter 51.

Output 53 from edge detector 48 is coupled to the clock or counting input of up/down counter 51 through delay circuit 101 and is also provided as an input signal to relative phase change decoding circuit 52. Decoding circuit 52 also receives output 49 from edge detector 55 as well as squaring circuit output signals 45 and 47. Up/down counter 51 may be any conventional counter which changes the number accumulated in its output register, shown as signal 64, in response to a signal or pulse at its clock input. This number is increased or decreased depending upon the state of signal 62 at the up/down signal input of counter 51. Decoding circuit 52 is utilized to control the up/down signal input of counter 51 by means of signal 62.

Within phase change decoding circuit 52, edge detector output signals 53 and 49 are provided as inputs to peak and valley detector 103, the output of which is provided as the clock input to flip flop 105. The output of flip flop 105, commonly called the Q output, drives one input of exclusive OR gate 107. Up/down input signal 62 for up/down counter 51 is provided by the output of exclusive OR gate 107.

Also within decoding circuit 52, squaring circuit output signals 45 and 47 are provided as inputs to direction detector 109 which has two outputs. Output 111 of direction detector 109 serves as the clocking input to flip flop 115 while output 113 serves as the reset input to both flip flops, 115 and 105. The output of flip flop 115 serves as the other input of exclusive OR gate 107.

The operation of decoding circuit 52 will be explained with reference to the waveforms illustrated in FIG. 3 which represent signals 45 and 47 which are the outputs from photo detector amplifiers 44 and 146 after squaring by circuits 60 and 61, respectively. As illustrated in FIG. 3, signal 47 is out of phase with and leads signal 45 by about 90° when pressure in transducer housing 32 is increasing as shown at 54. During time intervals of decreasing pressure, as shown at 56, the relationship is reversed and signal 45 leads signal 47 by 90°. The lead/lag characteristics of the two signals correspond to the lead/lag relationship of two interference patterns in waveguides 40 and 42 and can be decoded to determine transitions from periods of increasing pressure to periods of decreasing pressure, and vice versa. These transitions are used to reset up/down signal input 62 to counter 51. Any phase relationship other than 180° out of phase can be used for this determination.

Decoding of the phase relationship between signals 45 and 47 to determine transitions in pressure slew direction can be accomplished in a number of ways. In the preferred embodiment, relative phase reversals are decoded by the detection of two edges, or transitions, occurring in one signal without the occurrence of an intervening edge within the other signal as explained below. Such phase reversals are indicative of pressure slew direction transitions and are used to cause the counter to count in the other direction.

Decoding of such relative phase reversals, which indicate a peak or valley in the magnitude of the pressure signal, is accomplished by peak and valley detector circuit 103 which receives as inputs ouputs 53 and 49 from the edge detectors. Referring to FIG. 3 relative phase reversals, or pressure change direction transitions, in signals 45 and 47 are indicated as peak 80, at which the previously increasing pressure begins to decrease, and valley 82, at which the decreasing pressure begins to increase again.

As shown in FIG. 3, peak 80 and valley 82 are characterized by two transitions in one signal without an intervening transition in the other signal. For example, peak 80 may be identified by the occurrence of transitions 65 and 66 in lagging signal 45 which occur between transitions 68 and 70 in signal 47. Thus, two transitions have taken place in signal 45 before transition 68 in signal 47 is followed by transition 70. Conversely, valley 82 may be identified by the occurrence of transitions 72 and 74 in lagging signal 47 which occur without an intervening transition in signal 45. An inspection of the wave form for signals 45 and 47 show that this phenomena occurs only at peaks and valleys.

Decoding circuit 52 operates to change the state of up/down counter signal 62 in response to the occurrence of two transitions in one of the signals without an intervening transition in the other. This is accomplished by peak and valley detector 103 which serves to detect the occurrence of two transitions, or edges, in either signal 53 or signal 49 without an intervening transition, or edge, in the other signal. Upon detection of a peak or valley, detector 103 provides clocking input signal 117 to flip flop 105 which drives up/down signal 62 through exclusive OR gate 107. An ambiguity could result if the edge of a fringe was detected and counted at substantially the same time as a peak or valley was detected. For this reason, delay circuit 101 is provided at the input to up/down counter 51. In this way, phase decoder 52 will always make its determination with regard to a particular transition, before that transition is counted.

In order to accurately indicate pressure directions, the initial condition of signal 62 must accurately reflect the initial direction of pressure change. In addition, it is important to monitor the actual direction of the pressure change to provide a self correcting mechanism so that noise, or other error causing conditions, which caused the circuitry to flasely indicate or ignore a peak or valley, would not destroy the usefulness of the entire record of pressure changes.

To determine this actual direction, an alert state is identified whenever the logic level of signals 45 and 47 are both low. A representative alert state is illustrated in FIG. 3 at 58. The signal channel which first goes to a high logic level after the beginning of an alert state is indicative of the direction of the pressure direction. As shown in FIG. 3, signal 47 undergoes the first transition to a high logic level from alert state 58 and therefore indicates increasing pressure in transducer 30. Depending upon the actual construction of the devices used, it may be necessary to determine the direction of pressure change so indicated by experiment. The detection of the actual direction of pressure change is accomplished by direction detector 109 in phase decoder 52 which receives signals 45 and 47 as inputs. Detector 109 generates output 113 whenever a determination of the direction of pressure change can be made, i.e. at the first positive transition after an alert state. Output 113 serves to reset flip flops 105 and 115 to avoid any possible ambiguity error from an earlier determination of phase. Thereafter detector 109 generates output 111 in accordance with the direction of the change. For example, the circuitry may be configured so that increasing pressure changes are indicated by a positive, or logic level one signal at the clock input of flip flop 109 and decreasing pressure may be indicated by a zero logic level signal. The output of flip flop 115 will then represent the appropriate direction of change and will control the up/down counter 51 by signal 62 accordingly.

Whenever peak or valley detector 103 detects a peak or valley, the output of flip flop 105 is driven high so that exclusive OR 107 operates to invert the output of flip flop 115 until the next occurrence of output signal 113 serves to reset the flip flops.

While the foregoing Description of the Preferred Embodiment includes detailed information which will enable those skilled in the art to practice the invention, it should be recognized that the description therein is illustrative only and that many modifications and variations will be apparent to those skilled in the art having the benefit of these teachings. It is accordingly intended that the invention herein be defined solely by the claims appended hereto and that the claims be interpreted as broadly as permitted in light of the prior art.

We claim:

1. An optical system for generating a signal related to acoustic wave energy in a fluid medium comprising:
   a source of coherent optical radiation;
   optical waveguide means for defining a first pair of optical paths adapted so that different lengths of said first pair of paths are exposed to acoustic wave energy in the fluid medium;

first means for coupling coherent optical radiation from the source into each of said first pair of optical paths;

optical waveguide means for defining a second pair of optical paths;

second means for cross coupling optical radiation from each of said first pair of paths into each of said second pair of paths, so that interference fringes are generated in said second pair of paths as the result of said acoustic wave energy, said second means being adapted so that the phase of said interference fringes in the two paths of said second pair of paths will be different and so that the difference will be substantially different from 180°; and signal processing means responsive to the quantity of interference fringes in a first one of said second pair of paths and to the phase relationship between the interference fringes in the second pair of paths for generating said signal related to the acoustic wave energy.

2. The system of claim 1 wherein the first pair of optical paths are both reflectively terminated, have substantially different path lengths, are both exposed to the acoustic wave energy along substantially their full path lengths, and the means for coupling and the means for cross coupling are the same coupling means.

3. The system of claim 1 wherein the first pair of optical paths are connected between separate coupling means and cross coupling means, have substantially the same path lengths, and only one path is exposed to the acoustic wave energy.

4. The system of claim 1 wherein the signal processing means comprises:

means responsive to the phase relationship between the interference fringes in the second pair of paths for generating a signal indicative of direction of pressure change.

5. The system of claim 4 wherein the signal processing means further comprises:

first and second photodetector means for producing first and second electrical signals related to the magnitude of the optical radiation in each of said second pair of paths.

6. The system of claim 5 wherein the optical signal processing means further comprises:

counter means responsive to the electrical output signal from the first photodetector means for producing a signal related to the amplitude of said acoustic wave energy.

7. The system of claim 5 wherein the optical signal processing means further comprises:

first edge detector means for generating first output pulses in response to phase transitions of the first said electrical output signal related to the magnitude of optical radiation.

8. The system of claim 7 wherein the optical signal processing means further comprises:

counter means for producing a signal related to the amplitude of said acoustic wave energy by counting the first output pulses.

9. The system of claim 8 wherein the optical signal processing means further comprises:

second edge detector means for generating second output pulses in response to phase transitions of the second of said electrical output signals related to the magnitude of optical radiation; and phase change decoder means responsive to output pulses from both edge detector means for generating a signal related to the direction of pressure change of said acoustic wave energy.

10. The system of claim 9 wherein the phase decoder means further comprises:

means for determining changes in the direction of the pressure change by detecting the occurrence of two output pulses in the output of one of said edge detector means without an output pulse occurring in the output of the other of said edge detector means.

11. The system of claim 10 wherein the counter is an up/down counter and the signal related to the direction of pressure change of said acoustic wave energy controls the direction of counting.

12. An optical transducer for generating a signal related to acoustic wave energy in a fluid medium comprising:

a fluid filled housing adapted for submersion in the fluid medium, at least a portion of the housing being formed from acoustically transparent material;

means for substantially sealing the interior of the housing from the surrounding fluid;

optical waveguide means within the housing for defining a first pair of optical paths having mutually different lengths exposed to the acousitc energy in the fluid medium;

first means for coupling coherent optical radiation into the first pair of paths for modulation by acoustic wave energy within the fluid medium;

a second pair of optical paths;

second means for coupling optical radiation from each of said first pair of paths into each of said second pair of paths, so that interference fringes are generated in said second pair of paths in response to said acoustic wave energy, said second means being adapted so that the phase of said interference fringes in the two paths of said second pair of paths will be different, and said difference will be substantially different from 180° ; and signal processing means responsive to the quantity of interference fringes in at least one of said second pair of paths and to the phase relationship between the interference fringes in the second pair of paths for generating said signal related to the acoustic wave energy.

13. A system for generating a signal related to acoustic wave energy in a fluid medium comprising:

a source of coherent radiation;

a transducer including a first pair of optical paths adapted so that when said transducer is positioned in said fluid medium, acoustic wave energy in the fluid medium will cause the optical lengths of the two paths said first pair of paths to change by different amounts;

first means for coupling optical radiation from said source into each of said first pair of paths;

a second pair of optical paths;

second means for coupling optical radiation from each of said first pair of paths into each of said second pair of paths, so that interference fringes are generated in said second pair of paths in response to said acoustic wave energy, said second means being adapted so that the phase of said interference fringes in the two paths of said second pair of paths will be different, and said difference will be substantially different from 180°; and signal processing means responsive to the quantity of interference fringes in at least one of said second pair of paths and to the phase relationship of the interference fringes in the second pair of paths for generating said signal related to the acoustic wave energy.

14. The apparatus of claim 13 wherein said means for coupling optical radiation from said first pair of optical paths to said second pair of optical paths comprises a (3×3) fiber optic coupler.

15. The apparatus of claim 13 wherein both of the optical paths of said first pair of optical paths are reflectively terminated, both paths of said first pair of paths being exposed to acoustic wave energy along substantially the entire path lengths, and one of said first pair of paths being substantially shorter than the other and said means for coupling optical radiation from said source into said first pair of optical paths is the same as said means for coupling optical radiation from said first pair of optical paths into said second pair of optical paths.

16. The apparatus of claim 13 wherein only one of said first pair of optical paths is exposed to acoustic wave energy.

17. The apparatus of claim 13 wherein the phase difference between the interference fringes in said second pair of paths is between 10° and 170°.

18. The apparatus of claim 17 wherein said phase difference is about 90°.

19. The apparatus of claim 13 wherein said detection means comprises means for determining whether the interference fringes in one of said second pair of optical paths is leading or lagging the interference fringes in the other path of said second pair of optical paths, thereby determining whether the pressure of said acoustic wave energy is increasing or decreasing.

20. The system of claim 13, wherein said signal processing means comprises:

first and second photodetector circuits responsive to the optical radiation in each of said second pair of paths, said first photodetector circuit generating an electrical output signal having an amplitude peak corresponding to interference fringes in a first path of said second pair of paths and said second photo detector circuit generating an electrical output signal having amplitude peaks corresponding to interference fringes in a second path of said second pair of paths;

phase detection means responsive to the phase relationship of the output signals from said first and second photodetectors for generating an output signal indicative of whether the pressure in said fluid medium is increasing or decreasing; and counter means responsive to the number of amplitude peaks in at least one of the output signals from said photodetector circuits and to the output signals from said phase detection means for generating said signal related to acoustic wave energy.

* * * * *